2 Sheets—Sheet 1.

A. S. HUNTER,

Assignor to E. H. BARNEY and R. GIBSON.

SKATE.

No. 10,068. Reissued Apr. 4, 1882.

Witnesses:
Walter Fowler.
R. F. Hyde

Inventor;
Alpheus S. Hunter
by Henry A. Chapin
Atty

N. PETERS, Photo-Lithographer, Washington, D. C.

2 Sheets—Sheet 2.

A. S. HUNTER,

Assignor to E. H. BARNEY and R. GIBSON.

SKATE.

No. 10,068. Reissued Apr. 4, 1882.

Witnesses;

Walter Fowler,
R. F. Hyde

Inventor;

Alpheus S. Hunter
by Henry A. Chapin
Atty

N. PETERS, Photo-Lithographer, Washington, D. C.

UNITED STATES PATENT OFFICE.

ALPHEUS S. HUNTER, OF NEWBURG, NEW YORK, ASSIGNOR TO EVERETT H. BARNEY AND ROBERT GIBSON.

SKATE.

SPECIFICATION forming part of Reissued Letters Patent No. 10,068, dated April 4, 1882.

Original No. 91,539, dated June 22, 1869; antedated June 19, 1869. Application for reissue filed February 23, 1882.

*To all whom it may concern:*

Be it known that I, ALPHEUS S. HUNTER, of Newburg, in the county of Orange and State of New York, have invented an Improved Skate; and I do hereby declare that the following is a full, clear, and exact description of the same, reference being had to the annexed drawings, and to the letters of reference marked thereon.

The nature of my invention consists in the mode of fastening and unfastening the skate to and from the boot or shoe of the person using the same. The operation is done almost instantaneously. Only one motion of the lever secures the skate firmly to the foot. The same motion on the same lever backward unfastens the skate immediately, so that it drops from the foot. Besides this improvement in gaining time or avoiding the sometimes disagreeable work of fastening the skates by straps, this skate is fastened on those parts of the boot where it does not give the least pressure to the foot, which is very often a disagreeable and dangerous peculiarity of skates. This skate is fastened at one end to the heel of the boot, at the back part thereof, and at the other end to the sides of the sole, right across the ball of the foot. The skate is also easily adjustable for any size of heel and for the width of sole, and combines in this way all the good qualities of any other kind of skates.

Figure 1:
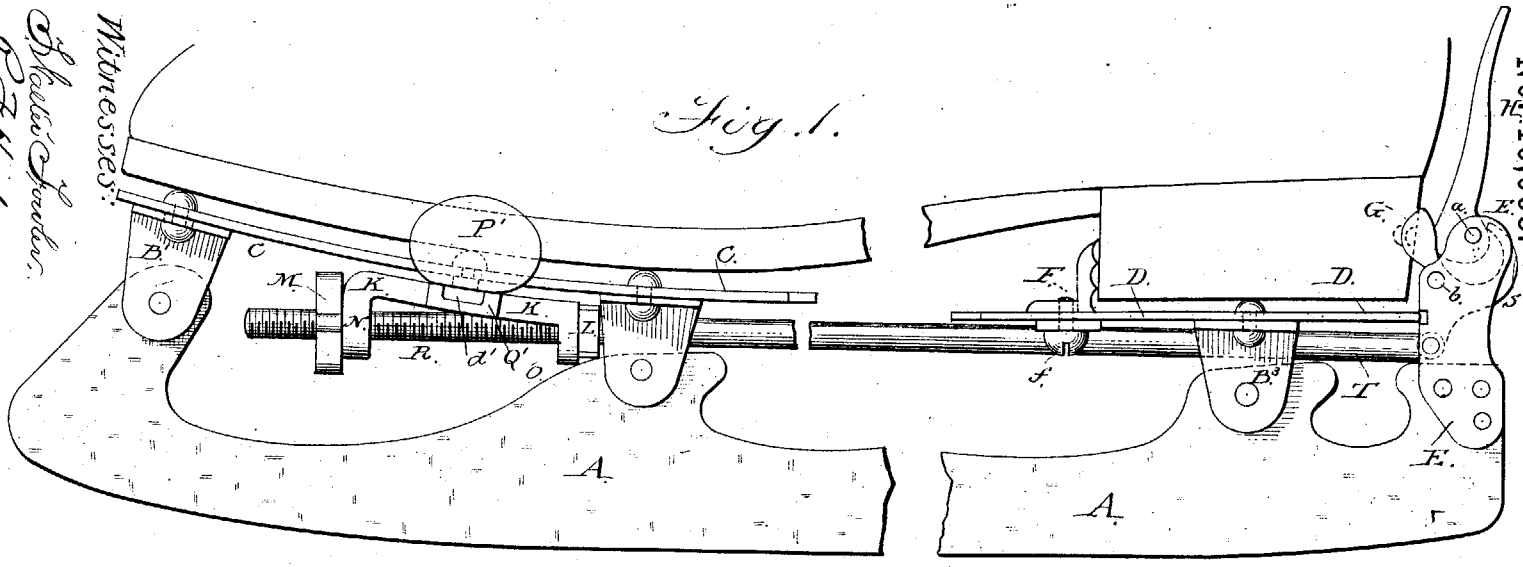
Figure 2:
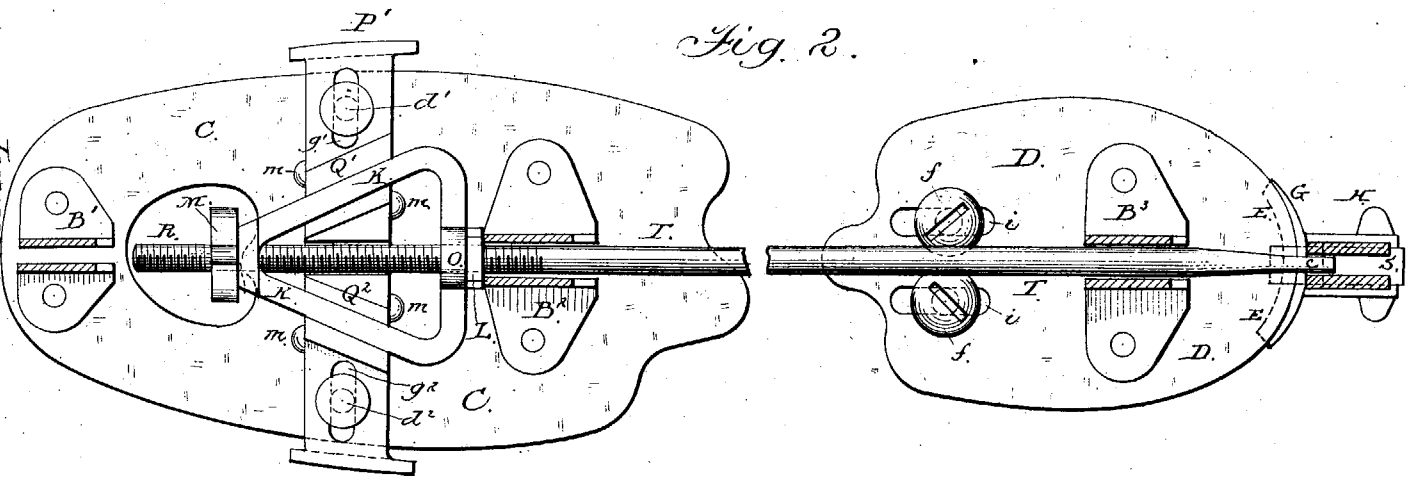
Figure 3:
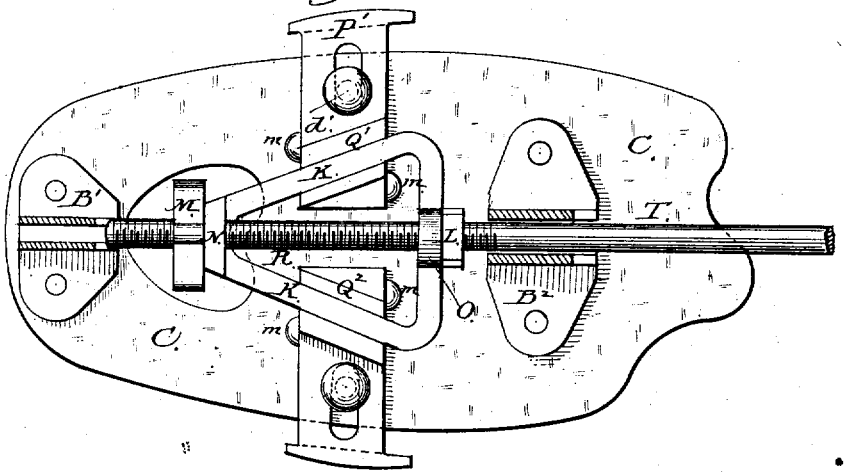
Figure 4:
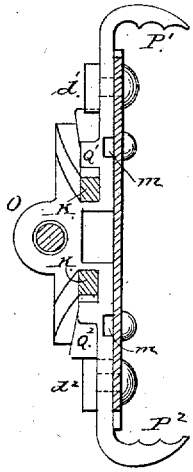
Figure 5:
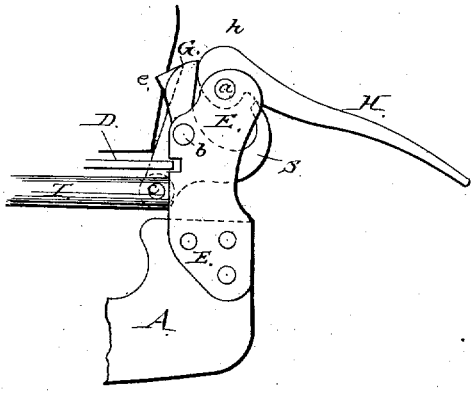

Figure 1 represents a side view of the skate when fastened to the foot. Fig. 2 is a bottom view of the same in the same position. Fig. 3 shows a bottom view of the foot-plate in position when the skate is loose. Fig. 4 is a cross-section of the foot-plate. Fig. 5 shows the back end of the skate only, with the lever in position when the skate is loose.

A A is the skate-iron, to which are fastened the foot-plate C C by the brackets $B'$ $B^2$ and the heel-plate D D by the brackets $B^3$.

To the heel plate D D is firmly secured by means of two screws, *f f*, and a strong angle-plate, F, with corrugated face, which takes hold of the inside face of the heel, and which plate can be adjusted to the size of the heel by altering its place along the two slots *i i*, cut in the heel-plate for this purpose.

To the foot-plate C C are secured two strong angle-plates, $P'$ $Q'$ and $P^2$ $Q^2$, which are movable crosswise to lengthen or shorten the distance between the two upright standing plates $P'$ $P^2$, to accommodate any size of sole to be firmly held between, and to open or shut enough to firmly hold or to let go the sole of the boot for which the position of angle-plates was adjusted. These angle-plates $P'$ $Q'$ and $P^2$ $Q^2$ are guided in their motion by two strong bolts, $d'$ $d^2$, with large heads, and by pins *m m*, along the edges, and slots $g'$ $g^2$ in the plates $Q'$ $Q^2$. This opening and closing of the plates $P'$ $P^2$ is done by the double-acting wedge-shaped piece K K, which is actuated by a rod, T T R, running through the eyes N and O at the ends of the wedge, on which rod is cut a thread for a suitable length, and two nuts, L and M, regulate the position of the wedge K K on the rod.

In the plates $Q'$ $Q^2$ are cut suitable grooves on their lower faces for the legs of the wedge K K to slide in, and by means of these grooves those plates are set outward as soon as the wedge is shifted nearer the end R by means of the two nuts L and M, and drawn inward when the wedge is placed farther away from the end R. This regulation of position of the wedge on the rod by means of those nuts L and M is done to fit a pair of skates for a certain pair of boots, or for a certain width of soles.

The opening and closing of the angle-plates $P'$ $P^2$, for fastening the skates to the boots, is done by shifting the wedge K with the rod T R together. This is done by another arrangement made at the heel end of the skate. For this purpose are riveted to the back end of the skate-iron two strong cheeks, E E, which carry at the top end a lever, H, the fulcrum of which is at *a*, and the short end of which is an eccentric cam, in such a shape that any pressure working on the flat face of the small spot *h* will produce a tendency to turn the lever H inward toward the boot, but never outward. This lever H is brought in connection with a three-armed clamp, G S *c*, the fulcrum of which is at *b*. The short lever-arm of lever H is working between the two arms G and S in such a way that the arm G is pushed inward toward the heel of the boot when the lever H is moved up, as shown in Fig. 1. That same movement pulls the lever-arm *c* back, and with it the rod T T, and with the rod the wedge K K, which in turn pulls, by the action of its inside faces, the plates P′ P² together, and draws them firmly to the edges of the sole of the boot, where their corrugated faces lodge tightly in the leather, and hold the skate securely to the boot.

The arm G has a circular shape, and is armed with a sharp projection, *e e*, which is pressed firmly into the heel by the lever H in the position as shown in Fig. 1, and holds the heel securely between the angle-plate F and circular plate G. The small flat face *h* of lever H lies hard against the back of the clamp-arm G, and all back pressure from the boot against the action of the lever H has the tendency to hold the skate firmer to the boot, as the direction of pressure runs below the fulcrum *a*. Therefore only by a power attached to the long arm of the lever H can the skate be loosened from the boot. As soon as sufficient power is used to turn back the lever H, the powerful gripe is gone which the different corrugated faces or plates had on the different places of the boot, and by moving the lever H back as far as shown in Fig. 5 the back face of lever H near the fulcrum took hold of the second arm, S, of the clamp G S *c*, and pushed it down so that the arm *c* came in position, as shown in Fig. 5. It pushed forward the rod T T R and wedge K K, which by the action of its outside faces pushed apart the plates P′ and P² and let go the boot. The same action of lever H on the arm S retracted the arm G of said clamp from the heel, and with it the sharp projection *e e* out of the heel, so that simultaneously at all points the boot was free from the skate or the skate from the boot.

The whole action of the lever H on the different parts is very powerful. It is the combination of lever and wedge, each for itself a powerful machine.

If the skates are regulated or adjusted for a pair of boots, the whole operation of putting on the skates is: Put the foot on the skate, that the inside face of the heel lies on plate F, and pull the lever H to the position as shown in Fig. 1.

The operation for taking off the skate is: Pull the lever H back, as shown in Fig. 5, and the skate is off.

What I claim as my invention, and desire to secure by Letters Patent, is—

1. The combination, in a skate, of movable clamps for grasping the sole of the boot, of movable clamps for grasping the heel at the back part thereof, a spur or abutment for the breast of the heel, a pivoted hand-lever adapted to operate both sets of clamps simultaneously, and a regulating-screw independent of said lever for adjusting the same, substantially as set forth.

2. In a skate, the combination of movable clamps for grasping the sole of the boot, movable clamps for grasping the heel at the back part thereof, a spur or abutment for the breast of the heel, and a pivoted vibratory hand-lever adapted to operate the same, substantially as set forth.

3. The combination, in a skate, of movable clamps for grasping the sole of a boot, movable clamps for grasping the heel at the back part thereof, a pivoted hand-lever adapted to operate both sets of clamps, and a regulating-screw independent of said lever for adjusting the same, substantially as set forth.

ALPHEUS S. HUNTER.

Witnesses:
GEORGE H. LINTON,
HORATIO FINCH.